(12) United States Patent
Wang

(10) Patent No.: US 6,176,476 B1
(45) Date of Patent: Jan. 23, 2001

(54) SUSPENSION SEATPOST FOR THE SEAT OF A BICYCLE

(76) Inventor: Yu-Jen Wang, No. 25, Hun-Kun Rd., Wang-Hang Tsuen, 710 Yung Kang City, Tainan (TW)

( * ) Notice: Under 35 U.S.C. 154(b), the term of this patent shall be extended for 0 days.

(21) Appl. No.: 09/370,364

(22) Filed: Aug. 9, 1999

(51) Int. Cl.$^7$ ........................................ F16F 1/00
(52) U.S. Cl. ............................................ 267/132
(58) Field of Search ................................. 267/132, 131, 267/221, 34, 64.22, 64.26, 226, 217; 297/202, 205, 207, 208; 280/283, 275, 276, 277, 279, 280; 188/322.17, 322.16

(56) References Cited

U.S. PATENT DOCUMENTS

| | | | | |
|---|---|---|---|---|
| 5,028,037 | * | 7/1991 | Wang | 267/64.13 |
| 5,044,648 | * | 9/1991 | Knapp | 280/283 |
| 5,115,723 | * | 5/1992 | Wang | 267/64.12 |
| 5,301,974 | * | 4/1994 | Knapp | 280/283 |
| 5,855,363 | * | 1/1999 | Svendsen | 267/132 |

* cited by examiner

Primary Examiner—Christopher P. Schwartz
Assistant Examiner—Devon Kramer
(74) Attorney, Agent, or Firm—Dellett and Walters

(57) ABSTRACT

According to an illustrative example of the invention, a suspension seatpost comprises a oil-gas buffer for absorbing the energy from vibration, and an adjustable device is to adjust the preload of the buffer to suit the requirement of user. The suspension seatpost has an upper end secured to the seat of bicycle and a fixed tube inserted into the seat tube of bicycle. In addition, The suspension seatpost also includes a slide rod axially movable in the fixed tube, a follower mounted in the lower end of the slide rod by a bolt to move therewith. Besides, the buffer includes a floating piston placed in the tube to divide the space into an upper chamber filled with oil and a lower chamber filled with gas, a piston rod slidably installed in the upper chamber of tube and having an upper end abutting against the bolt, and a piston mounted in the lower end of the piston rod to move therewith.

10 Claims, 3 Drawing Sheets

SUSPENSION SEATPOST FOR THE SEAT OF A BICYCLE

CROSS-REFERENCES TO RELATED APPLICATIONS

Not Applicable.

BACKGROUND OF THE INVENTION

1. Field of the Invention

The present invention relates to a suspension seatpost, and more particularly to a suspension seatpost for the seat of a bicycle.

2. Description of the Related Art

A conventional suspension seatpost (1) in accordance with the prior art shown in FIG. 3 is used for a bicycle and comprises a fixed tube (11) secured in the seat tube (30) and containing a chamber (110) therein, an abutting block (112) secured in the chamber (110) of the fixed tube (11), a slide rod (12) slidably mounted in the fixed tube (11) and having its upper end secured to the seat (2) by means of a connector (14), and a spring (13) mounted between the abutting block (112) and the lower end of the slide rod (12).

When the bicycle is subjected to vibration such as on a rugged road, a force will be exerted on the frame (3) to move the frame (3) upward. The slide rod (12) is then moved downward in the chamber (110) relative to the frame (3) to compress the spring (13), thereby providing a shock absorbing function so as to prevent the shock from being directly transmitted to the seat (2).

However, the spring (13) has a great stiffness such that the spring (13) will produce a small amount of deformation during the compressing process thereof. Consequently, the spring (13) cannot completely absorb the most of energy from vibration, thereby decreasing the shock absorbing effect of the suspension seatpost (1). The present invention has arisen to mitigate and/or obviate the disadvantage of the conventional suspension seatpost.

BRIEF SUMMARY OF THE INVENTION

The present invention is to provide a suspension seatpost for a bicycle. The suspension seatpost comprises a fixed tube secured in the seat tube of the bicycle and containing a chamber therein, a slide rod axially movable mounted in the fixed tube and having an upper end secured to the seat of the bicycle, a follower mounted in the lower end of the slide rod by a bolt to move therewith, and a buffer mounted in the fixed tube.

The buffer includes a tube, a floating piston placed in the tube to divide the space into an upper chamber filled with oil and a lower chamber filled with gas, a piston rod slidably installed in the upper chamber of tube and having an upper end abutting against the bolt, and a piston mounted in the lower end of the piston rod to move therewith.

Further benefits and advantages of the present invention will become apparent after a careful reading of the detailed description with appropriate reference to the accompanying drawings.

DETAILED DESCRIPTION OF THE INVENTION

Figure 1:
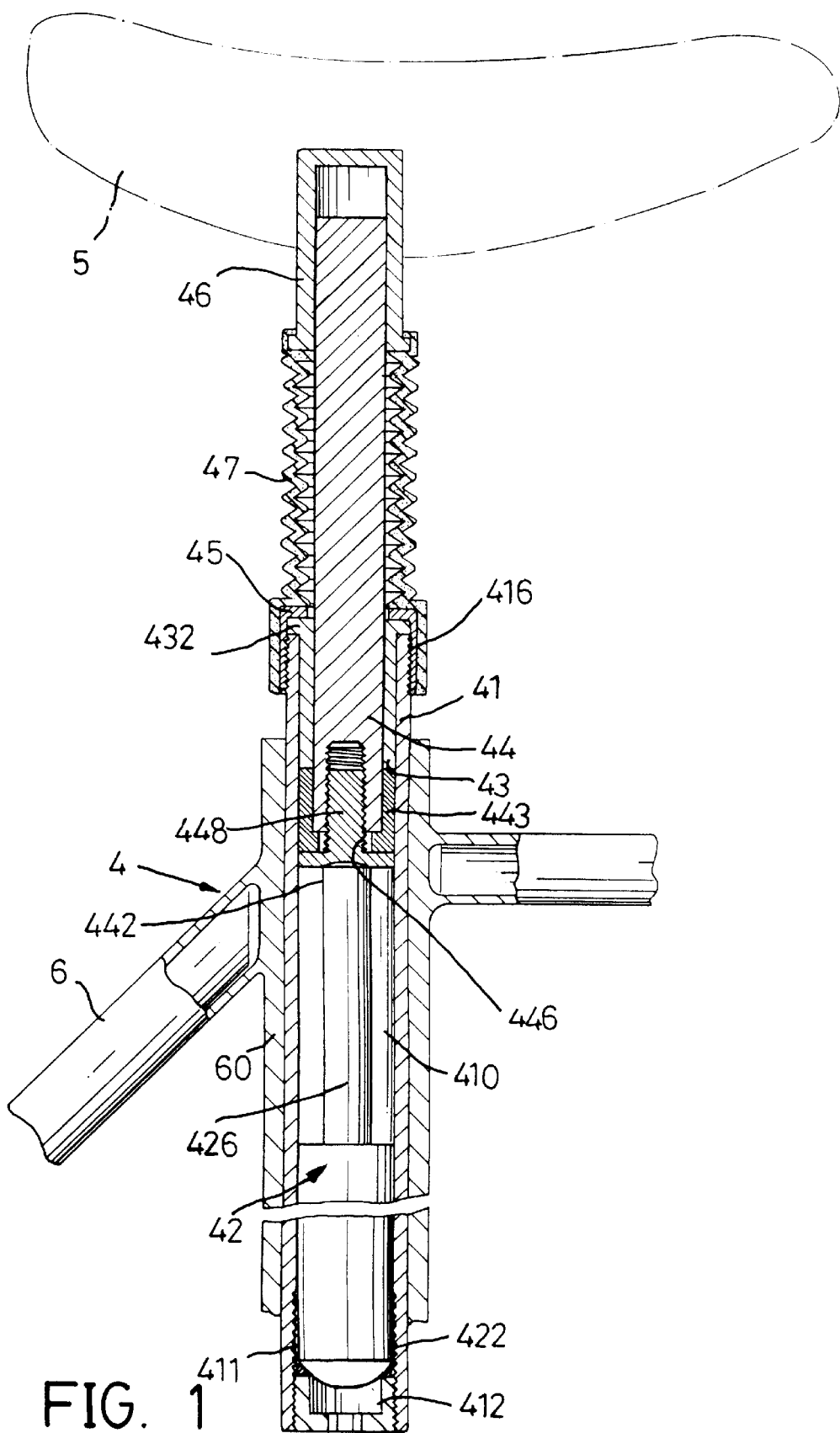
FIG. 1 is a front plan cross-sectional view of a suspension seatpost for the seat of a bicycle in accordance with the present invention.
Figure 2:
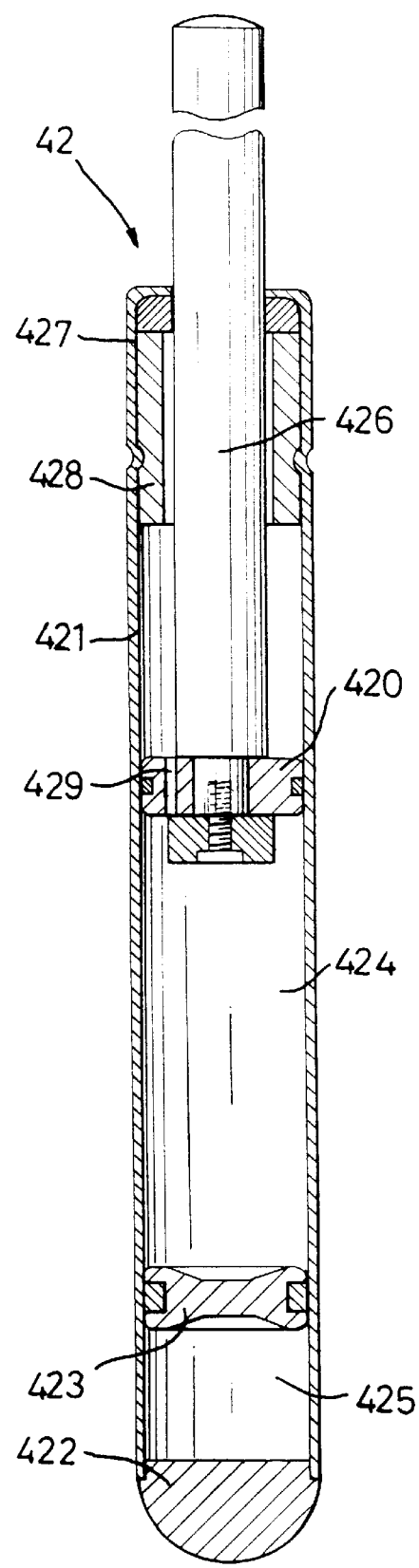
FIG. 2 is a front plan cross-sectional view of the buffer of the suspension seatpost as shown in FIG. 1.
Figure 3:
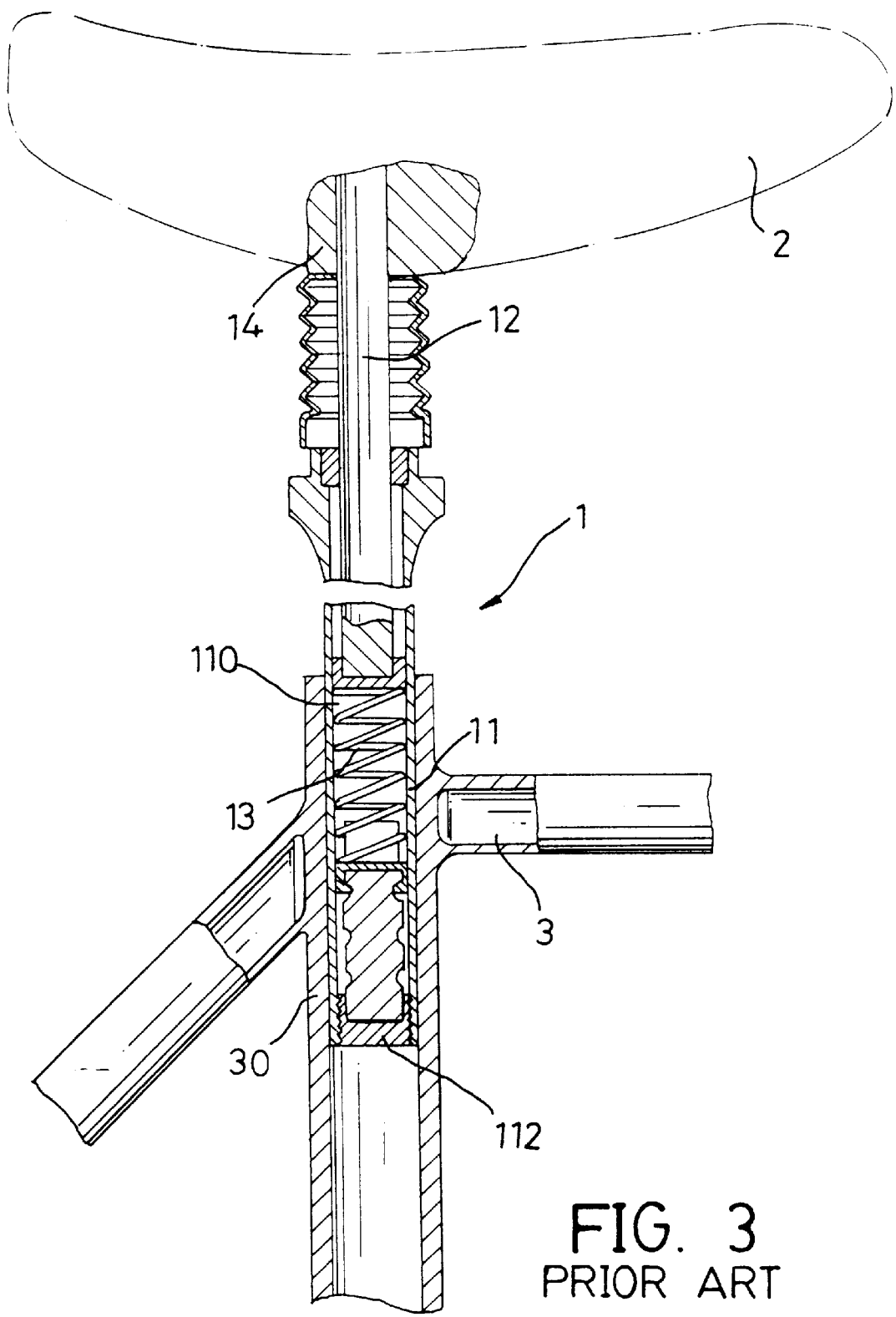
FIG. 3 is a front plan cross-sectional view of a conventional suspension seatpost for the seat of a bicycle in accordance with the prior art.

Referring now to FIGS. 1 and 2, a suspension seatpost (4) in accordance with the present invention is used for a bicycle and comprises a fixed tube (41) secured in the seat tube (60) and containing a chamber (410) therein, a slide rod (44) axially movable in the fixed tube (41) and having its upper end secured to the seat (5) by means of a connector (46), a bushing member (43) mounted between the slide rod (44) and the fixed tube (41) and having an annular flange (432) abutting the top of the fixed tube (41), a follower (443) mounted in the lower end of the slide rod (44) by a bolt (442) to move therewith, and a buffer (42) mounted in the fixed tube (41).

The bolt (442) abuts against the bottom of the follower (443) and includes a threaded post (448) screwed into the threaded hole (446) of the slide rod (44).

The fixed tube (41) includes an outer thread (416) formed on the upper end thereof, and the suspension seatpost (4) comprises a locking nut (45) screwed on the outer thread (416) and abutting against the annular flange (432) of the bushing member (43).

The suspension seatpost (4) also comprises a dust-proof cover (47) mounted on the slide rod (44) and located between the connector (46) and the locking nut (45).

The buffer (42) includes a tube (421) secured in the chamber (410) of the fixed tube (41), a floating piston (423) placed in the tube (421) to divide the space into an upper chamber (424) filled with oil and a lower chamber (425) filled with gas, a piston rod (426) slidably installed in the upper chamber (424) of tube (421) and having its upper end abutting against the bolt (442), and a piston (420) having a through hole (429) and mounted in the lower end of the piston rod (426) to move therewith.

The fixed tube (41) has an open lower end formed with an inner thread (411), and the suspension seatpost comprises an adjustable screw (412) slidably screwed into the inner thread (411) of the fixed tube (41), and abutting against the bottom of the tube (421) of the buffer (42) to press the tube (421) upward.

The buffer (42) includes a seal unit (427) mounted around the piston rod (426) and received in the tube (421), and a bushing member (428) mounted in the tube (421) and located beneath the seal unit (427).

In operation, when the bicycle is ridden on a rugged road, a force is exerted on the frame (6) due to the vibration of the bicycle to move the frame (6) upward. At the same time, the slide rod (44) is moved downward relative to the frame (6) to move down the bolt (442) which in turn moves the piston rod (426) downward which then moves the piston (420) downward, thereby compressing the hydraulic oil contained in the upper chamber (424) and the gas (425) contained in the lower chamber (425). During the compressing process, the hydraulic oil in the upper chamber (424) flows upward through the through hole (429) such that the piston rod (426) is slowly moved downward, thereby providing a shock absorbing effect so as to prevent the shock from being directly transmitted to the seat (5).

The adjustable screw (412) is used to adjust the position of the tube (421) in the chamber (410) of the fixed tube (41). It is equivalent to adjust the preload of the buffer (42). When the tube (421) is moved upward by the adjustable screw (412), the rigidity of the suspension seatpost (4) is increased, and when the tube (421) is moved downward by the adjustable screw (412), the rigidity of the suspension seatpost (4) is decreased.

It should be clear to those skilled in the art that further embodiments may be made without departing from the scope and spirit of the present invention.

What is claimed:

1. A suspension seatpost for a bicycle, said bicycle including a frame (6) having a seat tube (60), and a seat (5), said suspension seatpost comprising:

a fixed tube (41) secured in said seat tube (60) and containing a chamber (410) therein;

a slide rod (44) slidably axially movable in said fixed tube (41) and having an upper end and a lower end, said upper end secured to said seat (5);

a follower (443) mounted in said chamber (410) of said fixed tube (41) and secured to the lower end of said slide rod (44) by a bolt (442) to move therewith;

a buffer (42) mounted in said fixed tube (41) and including:

a tube (421) secured in said chamber (410) of said fixed tube (41);

a floating piston (423) placed in said tube (421) to divide the space into an upper chamber (424) and a lower chamber (425) in said tube (421);

a piston rod (426) slidably installed in said upper chamber (424) of said tube (421) and having an upper end and a lower end, said upper end abutting against said bolt (442); and a piston (420) having a through hole (429) and mounted in the lower end of said piston rod (426) to move therewith.

2. The suspension seatpost in accordance with claim 1, wherein said piston (420) contains a through hole (429) connecting to said upper chamber (424) of said tube (421).

3. The suspension seatpost in accordance with claim 1, wherein said buffer (42) includes a seal unit (427) mounted around said piston rod (426) and received in said tube (421).

4. The suspension seatpost in accordance with claim 3, wherein said buffer (42) includes a bushing member (428) mounted in said tube (421) and located beneath said seal unit (427).

5. The suspension seatpost in accordance with claim 1, wherein said upper chamber (424) of said tube (421) contains hydraulic oil therein.

6. The suspension seatpost in accordance with claim 1, wherein said lower chamber (425) of said tube (421) contains gas therein.

7. The suspension seatpost in accordance with claim 1, further comprising a bushing member (43) mounted between said slide rod (44) and said fixed tube (41), and having an annular flange (432) abutting against the top of said fixed tube (41).

8. The suspension seatpost in accordance with claim 7, wherein said fixed tube (41) includes an outer thread (416) formed on the upper end thereof, and said suspension seatpost further comprises a locking nut (45) screwed on said outer thread (416) and abutting against said annular flange (432) of said bushing member (43).

9. The suspension seatpost in accordance with claim 1, a bolt (442) abuts against the bottom of said follower (443) and includes a threaded post (448) screwed into a threaded hole (446) of said slide rod (44).

10. The suspension seatpost in accordance with claim 1, wherein said fixed tube (41) has an open lower end formed with an inner thread (411), and said suspension seatpost further comprises an adjustable screw (412) slidably screwed into said inner thread (411) of said fixed tube (41), and abutting the bottom of said tube (421) of said buffer (42) to press said tube (421) upward.

* * * * *